(12) United States Patent
Reddy et al.

(10) Patent No.: US 8,972,324 B2
(45) Date of Patent: Mar. 3, 2015

(54) SYSTEMS AND METHODS FOR ARTIFICIAL INTELLIGENCE SCRIPT MODIFICATION

(75) Inventors: Martin Reddy, San Francisco, CA (US); Oren M. Jacob, Piedmont, CA (US); Robert G. Podesta, Oakland, CA (US)

(73) Assignee: Toytalk, Inc., San Francisco, CA (US)

( * ) Notice: Subject to any disclaimer, the term of this patent is extended or adjusted under 35 U.S.C. 154(b) by 277 days.

(21) Appl. No.: 13/558,239

(22) Filed: Jul. 25, 2012

(65) Prior Publication Data

US 2014/0032467 A1    Jan. 30, 2014

(51) Int. Cl.
*G06N 5/02* (2006.01)
*G06N 3/00* (2006.01)
*G06N 99/00* (2010.01)

(52) U.S. Cl.
CPC .............. *G06N 3/008* (2013.01); *G06N 99/005* (2013.01)
USPC ......................................................... 706/46

(58) Field of Classification Search
None
See application file for complete search history.

(56) References Cited

U.S. PATENT DOCUMENTS

| | | | |
|---|---|---|---|
| 6,754,647 | B1 | 6/2004 | Tackett et al. |
| 6,959,166 | B1 | 10/2005 | Gabai et al. |
| 7,103,585 | B2 | 9/2006 | Jowell et al. |
| 2008/0091628 | A1* | 4/2008 | Srinivasa et al. ................ 706/12 |
| 2009/0275408 | A1 | 11/2009 | Brown |
| 2009/0319619 | A1 | 12/2009 | Affronti et al. |
| 2010/0049513 | A1 | 2/2010 | Huang et al. |
| 2011/0091021 | A1 | 4/2011 | Adkar et al. |
| 2011/0099130 | A1* | 4/2011 | Blumberg et al. ............... 706/12 |
| 2012/0116584 | A1* | 5/2012 | Kim et al. ..................... 700/246 |
| 2012/0158634 | A1 | 6/2012 | Spring |

FOREIGN PATENT DOCUMENTS

| | | |
|---|---|---|
| WO | WO-2001061541 A2 | 8/2001 |
| WO | WO-2001069799 A2 | 9/2001 |
| WO | WO-2006129967 A1 | 12/2006 |
| WO | WO-2011089450 A2 | 7/2011 |

OTHER PUBLICATIONS

Glas et al. "An Interaction Design Framework for Social Robots", RSS, 2011, pp. 8.*
Co-Pending U.S. Appl. No. 13/558,206, by Reddy, M., et al., filed Jul. 25, 2012.

(Continued)

*Primary Examiner* — Li-Wu Chang
(74) *Attorney, Agent, or Firm* — Perkins Coie LLP (57) ABSTRACT

Systems and methods for modifying content for interactive synthetic characters are provided. In some embodiments, a traversable script for an interactive synthetic character may be modified based on analytics relating to the use of the interactive synthetic character (e.g. words spoken by the user, language spoken, user demographics, length of interactions, visually detected objects, current environmental conditions, or location). The traversable script may include conversation rules that include actions to be performed by the interactive synthetic character. The actions can include, for example, producing audible or textual speech, performing animations, playing sound effects, retrieving data from data sources, and the like. The traversable script can be modified, customized, or improved based on the feedback from the use of the character by a plurality of users. The modifications may happen automatically or be reviewed by a content creator using a graphical user interface.

27 Claims, 6 Drawing Sheets

(56) References Cited

OTHER PUBLICATIONS

International Search Report and Written Opinion for International Application No. PCT/2013/052128 mailed Dec. 17, 2013, 13 pages.
International Search Report and Written Opinion for International Application No. PCT/2013/052135 mailed Nov. 16, 2013, 11 pages.
Bickmore, Timothy et al., "'How About This Weather?' Social Dialogue With Embodied Conversational Agents," American Association For Artificial Intelligence, 5 pp., 2000.
Eslick, Ian, "Scratch Talk and Social Computation: Towards a Natural Language Scripting Model," 10 pp., 2008.
Green, Nancy et al., "An Assistive Conversation Skills Training System for Caregivers of Persons With Alzheimer's Disease," American Association for Artificial Intelligence, 6 pp., 2004.
Green, Nancy L., et al., "Dialogue Generation in an Assistive Conversation Skills Training System For Caregivers of Persons With Alzheimer's Disease," AAAI Technical Report SS/03/06, American Association for Artificial Intelligence, 8 pp., 2003.
Jia, Jiyou et al., "Script/Based Design for Human/Computer Dialog in Given Scenarios for English Learners," Eigth IEEE International Conference on Advanced Learning Technologies, Santander, Spain, pp. 739-743, Jul. 1-5, 2008.
Non-Final Office Action mailed Jun. 11, 2014, in Co/pending U.S. Appl. No. 13/558,206 by Reddy, M., et al. filed Jul. 25, 2012.
Popescu, Ana/Maria et al., "Towards a Theory of Natural Language Interfaces to Databases," Proceedings of the 8th International Conference on Intelligent User Interfaces, Miami, Florida, pp. 149-157, Jan. 12-15, 2003.

\* cited by examiner

SYSTEMS AND METHODS FOR ARTIFICIAL INTELLIGENCE SCRIPT MODIFICATION

TECHNICAL FIELD

Various embodiments of the present invention generally relate to artificial intelligence script modifications. More specifically, various embodiments of the present invention relate systems and methods for modifying artificial intelligence scripts based on data collected during interactions with a supported synthetic character.

BACKGROUND

Toys have been around for thousands of years. Egyptian, Grecian, and Roman children played with toys that were made from stone, pottery, wax, wood, and other primitive materials. These toys, however, were static and children were left to use their imagination in forming animations or personalities for the toys. More recently toys have included mechanical features that allowed for simple mechanical movements or for the recitation of a word or phrase when the child pulled a string.

With the proliferation of computers, actuators, and processing technology, interactive toys and computer games have become more common. In some cases, these toys are capable of using this technology to sense the environment, make decisions, and interact with children. Creating a toy having various personality traits is even more difficult. Traditional tools for creating scripts and content are too simplistic to allow for the efficient creation of complex interactive content. Moreover, traditional toys typically do not provide any feedback regarding how the toys are being used. As a result, the content creators are left to write the scripts based on specifications set before the toy is released to the public. As such, there are a number of challenges and inefficiencies found in traditional tools for creating content for artificial intelligence systems such as toys and games.

SUMMARY

Systems and methods are described for modifying artificial intelligence scripts based on data collected during interactions with a supported synthetic character. In some embodiments, a method comprises receiving data related to interactions with a synthetic character (e.g., supported by a toy or game) using a current script. The data related to the interactions with the synthetic character may be dynamically presented to an analytics engine as it is received. In other embodiments, the data may be collected and then transferred in batches, on a set schedule, upon the detection of an event, or on-demand. The analytics engine can then generate an activity index based on the data. The activity index may include a variety of analytics regarding the use of the synthetic character and the interactions with the script. Examples include phrases spoken or typed by the user, language use, user demographics, length of interactions, current environmental conditions, location, and others. In some cases, the activity index can include a statistical analysis of the data.

The current script can be updated (possibly in real-time) using the activity index. In some cases, a script editor that allows a user to modify the script can be generated. In at least one embodiment, the current script may be automatically updated using a learning algorithm to generate new interactions.

Some embodiments of the present invention provide for a computer-implemented method for updating content for an interactive synthetic character. The method can include generating a data set representing features of interactions with the interactive character based on an interactive script. The data set can then be transmitted to an analytics engine for analysis (e.g., a statistical analysis). The analysis can be retrieved from the analytics engine and the interactive script can be updated (e.g., using a script editor or learning algorithm) based on the analysis.

Embodiments of the present invention also include computer-readable storage media containing sets of instructions to cause one or more processors to perform the methods, variations of the methods, and other operations described herein.

Various embodiments of the present invention include a system having a processor, memory, data module, analytics engine, communications module, script editor, digital library, analysis platform, and other modules, components, and/or editors. In some embodiments, the data module can collect data from interactions (e.g., a time/date of interaction, a length of interaction, a location, a list of visually detected objects, a language spoken, etc.) with a synthetic character having a traversable script that provides interactive responses. For example, the data module may use a speech recognition or natural language processing system to collect voice data. These interactions can be stored in the digital library and may be assigned categories that can be accessed by the script editor. In some cases, the data module may also collect environmental conditions (e.g., temperature, current/recent weather, etc.).

The analytics engine can generate a set of script analytics based on the data collected from interactions with the synthetic character collected by the data module. The analytics engine may be part of a remote analysis platform. The analysis platform can perform a variety of different operations. In some embodiments, the analysis platform may be operable to calculate normative variations in the set of script analytics when compared to an aggregated data set. In some embodiments, the remote analysis platform may generate a set of modifications to the traversable script based on the normative variations. The script editor can be used to manually or automatically edit (e.g., using a learning algorithm) the traversable script based on the set of script analytics gathered from one or more synthetic characters.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present invention will be described and explained through the use of the accompanying drawings in which.

The drawings have not necessarily been drawn to scale. For example, the dimensions of some of the elements in the figures may be expanded or reduced to help improve the understanding of the embodiments of the present invention. Similarly, some components and/or operations may be separated into different blocks or combined into a single block for the purposes of discussion of some of the embodiments of the present invention. Moreover, while the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Various embodiments of the present invention generally relate to artificial intelligence script modifications. More specifically, various embodiments of the present invention relate systems and methods for modifying artificial intelligence scripts based on data collected during interactions with a supported synthetic character. Until recently, toys and systems were not capable of supporting sophisticated interactions with children and other users. The proliferation of computers, actuators, sensors, and other technology have recently allowed for more interactive toys and systems. Moreover, the prices of these components have become cheap enough to allow for the integration in systems that are financially available to everyone.

While these toys and systems are capable of sensing the environment, making decisions, and interacting with users, there has typically been no feedback or monitoring on how users, both individually and as a group, interact with the supported synthetic character. Traditional tools for creating scripts and content for the synthetic character have been too simplistic to allow for the efficient creation of complex interactive content. Moreover, since these traditional toys and systems have not provided feedback on how users interact with the synthetic character, traditional tools have not been able to utilize, incorporate, or present the feedback data for modifying the script.

In contrast, various embodiments of the present invention allow for various data to be collected during interactions with a supported synthetic character. The data can be used to generate different analytics regarding interactions with the supported synthetic character. These analytics can then be used by content creators or script writers to modify, customize, and/or improve the scripts and content for an individual user and/or a group of users. For example, in some embodiments, the synthetic character's interactions with a user may include a set of questions to get to know the user (e.g., what's your age, favorite color, favorite game, etc.). The answers can be collected and used to modify the script being used for that toy. Patterns of use, questions asked, statements made, environmental observations, and other types of data may also be collected, tracked, and analyzed for modifying the content of the script.

While, for convenience, embodiments of the present invention are described with reference to interactive synthetic characters for toys and games, embodiments of the present invention are equally applicable to various other AI systems with business, military, educational, and/or other applications. The techniques introduced here can be embodied as special-purpose hardware (e.g., circuitry), or as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Terminology

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary channels or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to various embodiments," "in the embodiments shown," "in other embodiments," and the like generally mean the particular feature, structure, or characteristic following the phrase is included in at least one embodiment of the present invention, and may be included in more than one embodiment of the present invention. In addition, such phrases do not necessarily refer to the same embodiments or to different embodiments.

If the specification states a component or feature "may," "can," "could," or "might" be included or have a characteristic, that particular component or feature is not required to be included or have the characteristic.

The term "module" refers broadly to software, hardware, or firmware (or any combination thereof) components. Modules are typically functional components that can generate useful data or other output using specified input(s). A module may or may not be self-contained. An application program (also called an "application") may include one or more modules, or a module can include one or more application programs.

General Description

Figure 1:
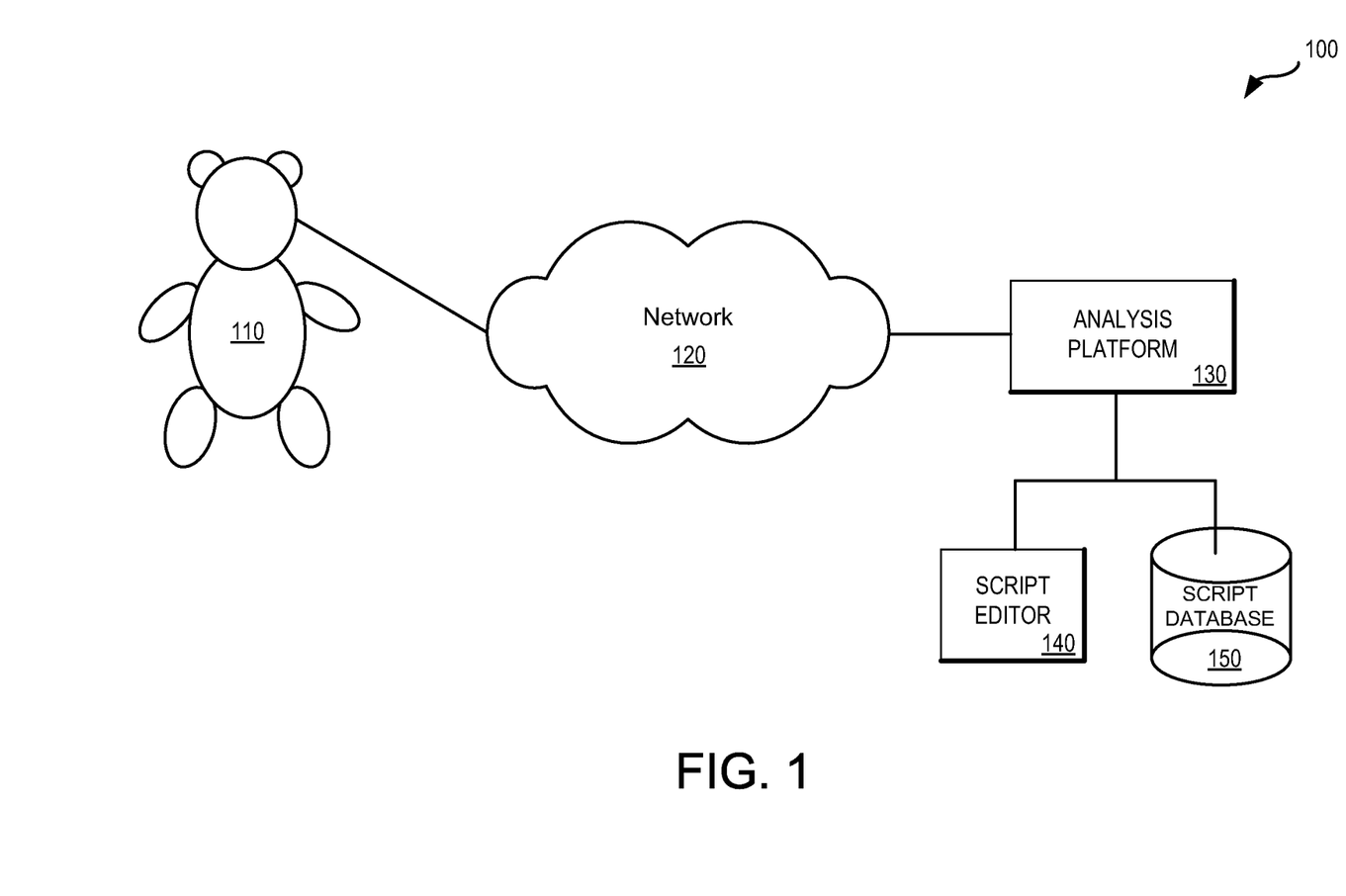
FIG. 1 illustrates an example of an internet-based environment in which some embodiments of the present invention may be utilized.

FIG. 1 illustrates an example of an internet-based environment 100 in which some embodiments of the present invention may be utilized. The embodiments illustrated in FIG. 1 show a toy, device, or synthetic character 110 capable of supporting customized interactive content. In many embodiments, the interactive content includes a traversable script with a set of conversation rules. Each rule may be associated with an action to be performed by the synthetic character 110 and one or more conditions that must be satisfied in order to navigate to another conversation rule. To allow for more interesting content, different rules may be reachable from a current rule depending on which conditions have been satisfied.

Synthetic character 110 can include a variety of sensors, actuators, processors, recording devices, speech recognition engines, natural language processors, and/or other components or modules for creating an interactive experience with a user. Some of these components (e.g., the sensors and natural language processors) may be used in determining which conditions have been met. In addition, other components may be used to create different movements and/or interactions (e.g., actuators to animate a toy). In accordance with some embodiments of the present invention, synthetic character 110 can record the interactions or a variety of information about the interactions for logical analysis.

In some embodiments, some or all of the analysis may be performed by the components associated with the synthetic toy. In other embodiments, the toy may simply pass the information along to remote analysis platform 130. As illustrated in FIG. 1, the information about the environment, toy, script, and/or interactions between toy 110 and a user can be transmitted through network 120 to analysis platform 130. In some cases, the data may be dynamically transmitted to the analysis platform 130 as it is generated. In other embodiments, the data may be collected and then transferred in batches, on a set schedule, or on-demand. Analysis platform 130 can use this information to generate a detailed analysis with a variety of analytics. The current script being used by synthetic character 110 can be updated (possibly in real-time) using this analysis. In some cases, script editor 140 allows a creative script writer to modify the script based on a presentation of the detailed analysis.

Network 120 can be any group of interconnected devices capable of exchanging information. In some embodiments, network 120 may be as few as several personal computers on a Local Area Network (LAN) or as large as the Internet. In some cases, network 120 may be comprised of multiple networks (private and/or public), even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. In some cases, toy 110 may be wirelessly coupled to the network, connected through one or more wires, or connected through one or more other intermediary devices.

Script database 150 may be used to store the content created by script editor 140. Various toys, games, or AI systems can retrieve the content from script database 150 via network 120. In some embodiments, script database 150 can also store various recordings (e.g., media clips, recordings of actors reading various phrases or dialog portions). The content stored in script database 150 can link to one or more of these recordings or may include a copy that can be stored locally on the toy, game, or other AI system.

Figure 2:
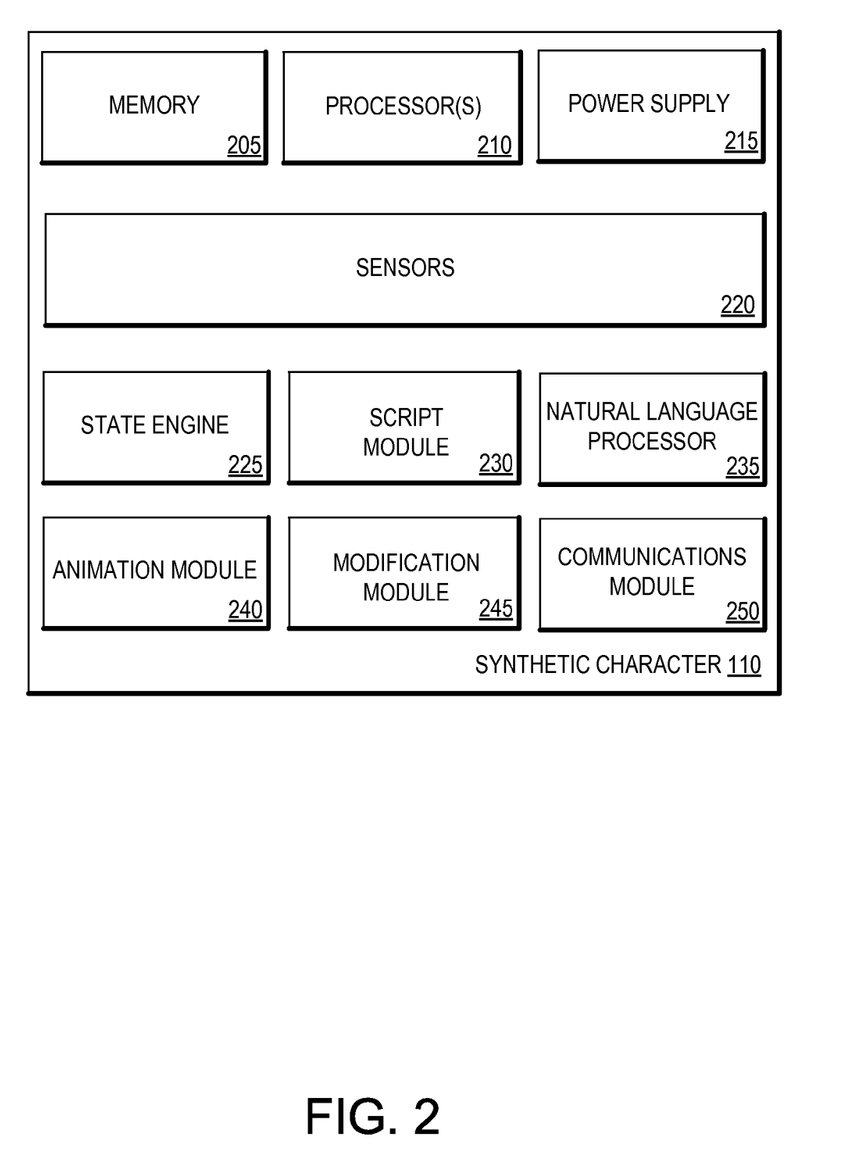
FIG. 2 shows a block diagram with exemplary components of a system supporting a synthetic character in accordance with one or more embodiments of the present invention.

FIG. 2 shows a block diagram with exemplary components of a system supporting a synthetic character 110 in accordance with one or more embodiments of the present invention. According to the embodiments shown in FIG. 2, the system can include memory 205, one or more processors 210, power supply 215, sensors 220, state engine 225, script module 230, natural language processor 235, animation module 240, modification module 245, and communications module 250. Other embodiments of the present invention may include some, all, or none of these modules and components along with other modules, applications, and/or components. Still yet, some embodiments may incorporate two or more of these modules into a single module and/or associate a portion of the functionality of one or more of these modules with a different module. For example, in one embodiment, state engine 225 and script module 230 can be combined into a single module for navigating the scripted content.

Memory 205 can be any device, mechanism, or populated data structure used for storing information. In accordance with some embodiments of the present invention, memory 205 can encompass any type of, but is not limited to, volatile memory, nonvolatile memory and dynamic memory. For example, memory 205 can be random access memory, memory storage devices, optical memory devices, magnetic media, floppy disks, magnetic tapes, hard drives, SIMMs, SDRAM, DIMMs, RDRAM, DDR RAM, SODIMMS, erasable programmable read-only memories (EPROMs), electrically erasable programmable read-only memories (EEPROMs), compact disks, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 205.

Memory 205 may be used to store instructions for running one or more applications or modules on processor(s) 210. For example, memory 205 could be used in one or more embodiments to house all or some of the instructions needed to execute the functionality of sensors 220, state engine 225, script module 230, natural language processor 235, animation module 240, modification module 245, and communications module 250.

Power supply 215 can be used to provide power to the different components of the system (e.g., toy) supporting the synthetic character. Power supply 215 may include a battery allowing for mobility of the toy. However, there are many other sources of power that may be used depending on system requirements. In some embodiments, power supply 215 can provide one or more inputs for navigating through the script. For example, a low power reading from power supply 215 might cause state engine 225 to navigate to a state where the toy says something like "I am really tired. I sure could use a nap right now." As a further example, if the synthetic character has also detected a bed, the toy might say something like "I am really tired and would love to take a nap on the bed." In addition, when a lower power reading is provided the script may reduce or eliminate various animations of the toy. Similarly, other readings may result in other actions by the toys.

Sensors 220 can be any type of sensor for measuring environmental conditions or user interactions. For example, toy 110 may include one or more heat sensors, light sensors, sound sensors, microphones, pressure sensors, magnetism sensors, temperature sensors, and/or motion sensors. Sensors 220 may be part of the toy or separate from the toy (e.g., placed around a child's room). These sensors may produce signals based on their measures that can be directly used by state engine 225 to move from state to state within a script.

In other cases, an intermediary device may be needed to convert the signal from the sensor into an input that the state engine 225 can use. For example, the signals generated by a microphone may be submitted to natural language processor 235. Natural language processor 235 may convert these signals into text using a speech recognition engine that can be used by state engine 225. Similarly, an output (e.g., an action) from the traversable script may be sent to another module for implementation. For example, the action may require a phrase to be read or a sound clip to be played. As another example, the script may require the synthetic character to move. These requirements for movement may be processed by animation module 240.

In some embodiments, synthetic character 110 may include a modification module 245 capable of receiving instructions to modify the traversable script. These instructions may require that a new script be downloaded from script database 150. In other cases, these instructions may include additional conversation rules which need to be integrated into the current script. Modification module 245 can interpret these instructions and perform the necessary actions to modify or replace the current script.

Communications module 250, in some embodiments of the present invention, may be configured to translate messages between formats and manage the message flow between components and/or other systems. For example, communications module 250 may be used to send collected data on a schedule (e.g., periodic, on-demand, user-specified, event triggered, etc). Communications module 250 may also receive modification to the traversable script from analysis platform 130 or retrieve a new script from script database 150.

Figure 3:
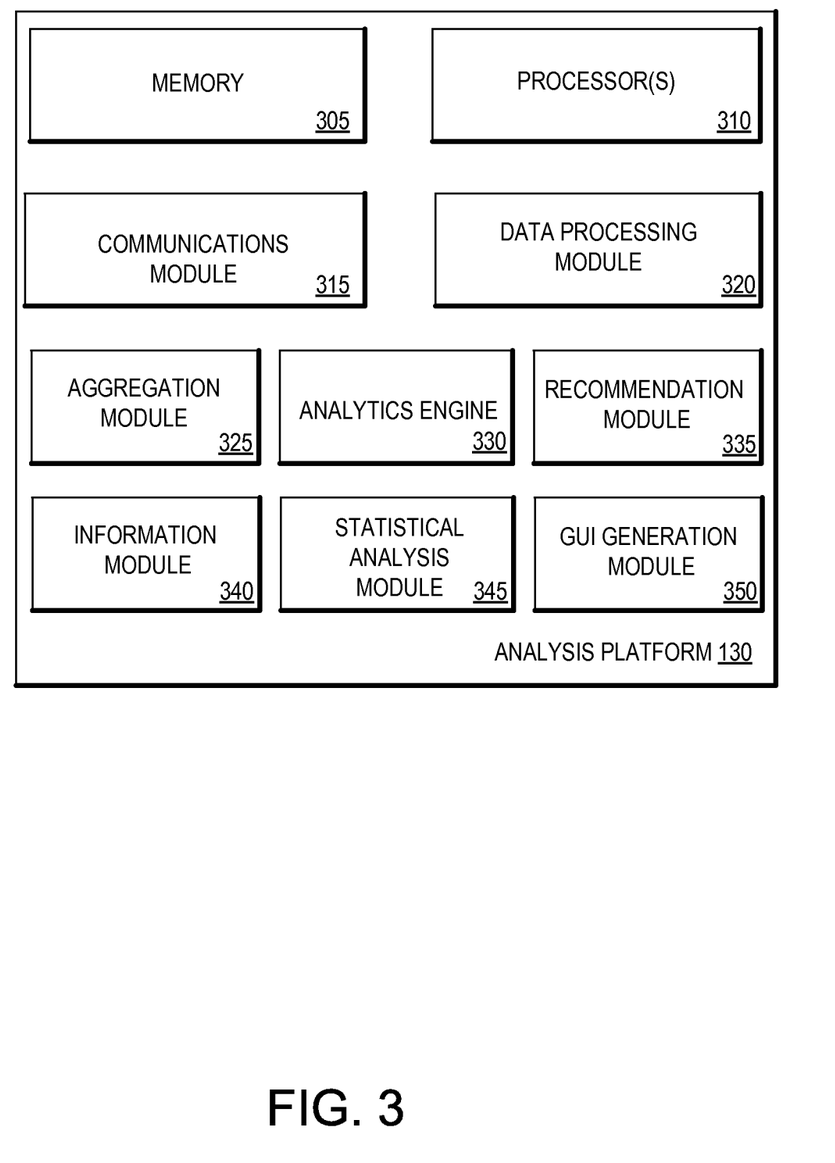
FIG. 3 shows a block diagram with exemplary components of an analysis platform in accordance with various embodiments of the present invention.

FIG. 3 shows a block diagram with exemplary components of an analysis platform 130 in accordance with various embodiments of the present invention. According to the embodiments shown in FIG. 3, the system can include memory 305, one or more processors 310, communications module 315, data processing module 320, aggregation module 325, analytics engine 330, recommendation module 335, information module 340, statistical analysis module 345, and GUI generation module 350. Other embodiments of analysis platform 130 may include some, all, or none of these modules and components along with other modules, applications, and/or components. Still yet, some embodiments may incorporate two or more of these modules into a single module and/or associate a portion of the functionality of one or more of these modules with a different module.

Memory 305 can be any device or mechanism used for storing information as described above with reference to memory 205. Memory 305 may be used to store instructions for running one or more applications or modules on processor(s) 310. For example, memory 305 could be used in some embodiments to house all or some of the instructions needed to execute the functionality of communications module 315, data processing module 320, aggregation module 325, analytics engine 330, recommendation module 335, information module 340, statistical analysis module 345, and/or GUI generation module 350.

Communications module 315, according to some embodiments of the present invention, may translate messages between different formats and/or manage communication flow similar to communications module 250. Communications module 315 may also receive the data from synthetic character 110 and submit it to data processing module 320 for processing. For example, in some embodiments, data processing module 320 may use aggregation module 325 to incorporate the data received from synthetic character 110 into an aggregated data set. In some cases, there may be multiple aggregated data sets depending on various features of the data (e.g., age of the user, available sensors, script version, geographic region, etc.) Some embodiments use information module 340 to collect information about the synthetic character and the users.

Analytics engine 330, in accordance with some embodiments, can generate a set of script analytics based on the data collected from interactions with the synthetic character 110. Analytics engine 330 may be part of a remote analysis platform, part of a distributed platform, and/or part of the system associated with the synthetic character 110. In some embodiments, analytics engine 330 can use statistical analysis module 345 to generate statistical analytics. In some cases, analytics engine 330 may calculate variations of the data from the norm (i.e., normative variations) of an aggregated data set. Using this information, recommendation module 335 may generate the set of modifications for the traversable script. These modifications may be presented to a content writer for review and editing or may be directly incorporated into the script without approval.

GUI generation module 350 can generate one or more graphical user interface screens for reviewing the analytics, proposing modifications of the script to a content writer, and/or allowing a content writer to edit the script. In some cases, these graphical user interface screens can access a digital library having stored thereon a plurality of interactions, templates, or script styles that may be sorted by categories.

Figure 4:
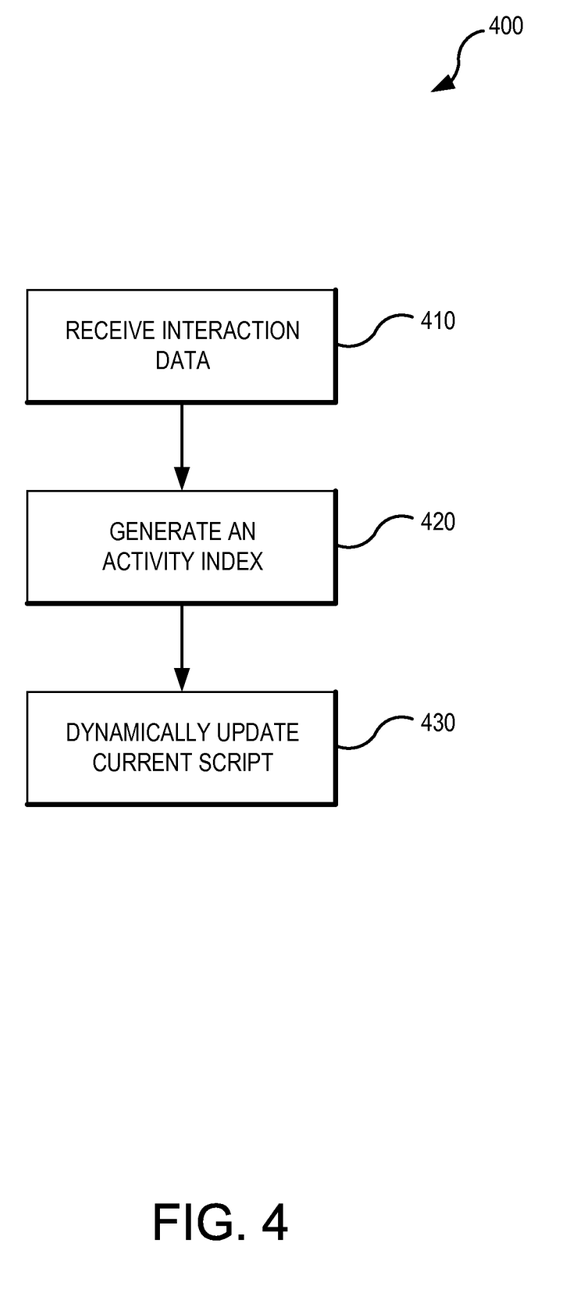
FIG. 4 is a flow chart with an exemplary set of operations for modifying a traversable script in accordance with some embodiments of the present invention.

FIG. 4 is a flow chart with an exemplary set of operations 400 for modifying a script in accordance with some embodiments of the present invention. The operations illustrated in FIG. 4 may be performed in various embodiments by a data processing module, a communications module, a script editor, a processor, and/or other modules, engines, or components of the analysis platform. As illustrated in FIG. 4, during receiving operation 410, interaction data is received from the system supporting the synthetic character. Examples of the types of interaction data may include a time/date of interaction, a length of an interaction, user response time, a location, a list of visually detected objects, a language spoken, a record of the synthetic character responses and inputs, time delays, system information (e.g., sensors available, script version, etc.), comments from users, user ages, signals received from various sensors, data inputs, environmental observations, user interactions, etc. The data may be aggregated with data from other uses and/or other toys.

Once the data is received, generation operation 420 generates an activity index. The activity index represents the results from a logical analysis of the data as a set of analytics. For example, the analytics may indicate that certain parts of the traversable script are being used more frequently and additional content should be developed. As another example, the analytics may indicate that certain age groups interact with the toy in different ways than other age groups. In some embodiments, the analytics can include a statistical analysis of the data received from the toy. In other embodiments, various data mining algorithms may be used to detect patterns of use or deficiencies in the content.

Using the analytics in the activity index, update operation 430 can update the script being used by the synthetic character. Update operation 430, may occur in real-time in some embodiments of the present invention. In other cases, the data may be monitored for deviations or events (e.g., phrases from the user) that would trigger one or more flags for updating the script. In some cases, a script editor can generate a graphical user interface screen that allows a content created to modify the script. In at least one embodiment, the current script may be automatically updated using a learning algorithm to generate new interactions.

As an example, the analytics may show that a user's response time is slower or faster than expected. In order to keep the user attention, the script may be modified to respond more or less quickly to the user. In other cases, the actual content may be modified.

Figure 5:
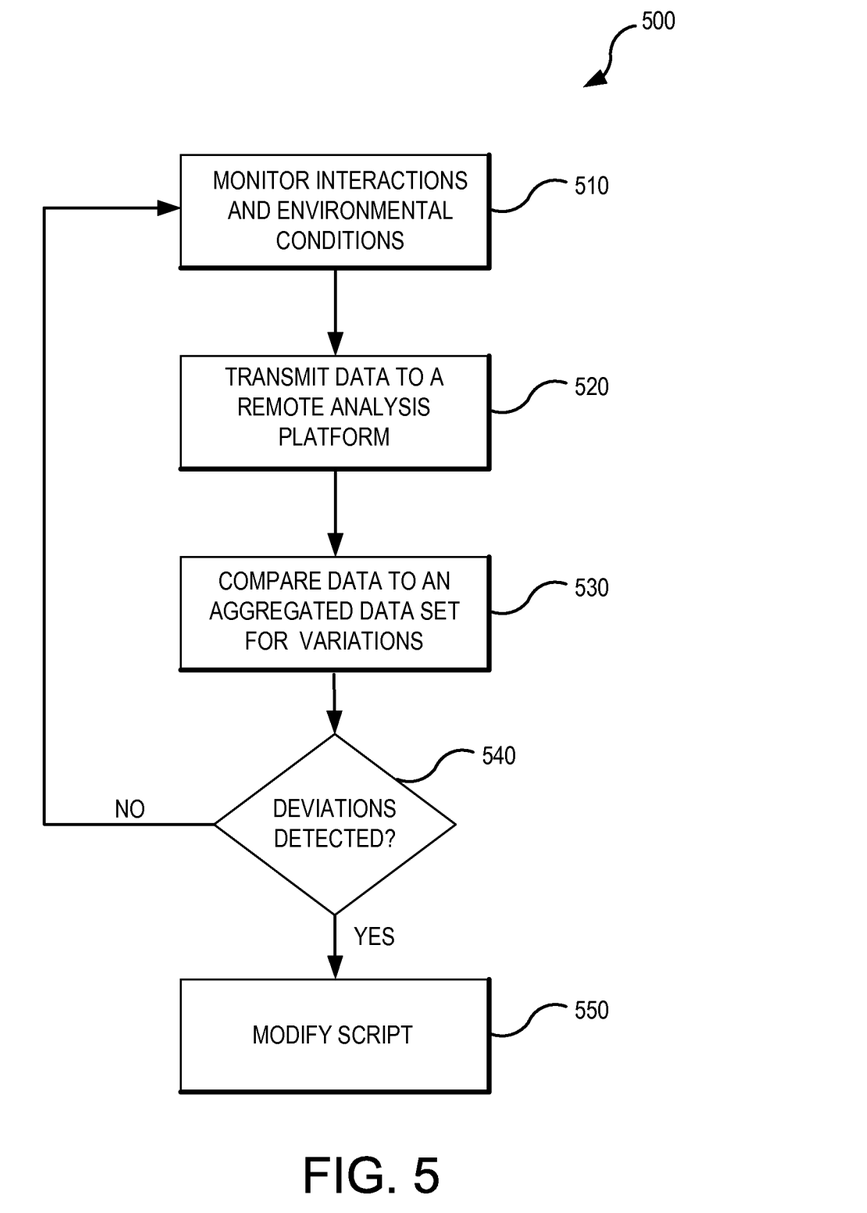
FIG. 5 is a flow chart with an exemplary set of operations for modifying a traversable script based on analytics collected from interactions aggregated from multiple synthetic characters in accordance with various embodiments of the present invention.

FIG. 5 is a flow chart with an exemplary set of operations 500 for modifying a traversable script based on analytics for data collected from interactions aggregated from multiple synthetic characters in accordance with various embodiments of the present invention. By aggregating data from a pool of users, more information can be extracted regarding a particular set of interactions with the synthetic character relative to the average user. In some embodiments, the operations illustrated in FIG. 5 can be performed by communications module 250, script editor 140, processor 210, and/or other modules, engines, or components of analysis platform 130 or synthetic character 110.

During monitoring operation 510, interactions and environmental conditions of the synthetic character are monitored and collected. In some embodiments, interactions such as spoken or typed phrases, user response time, length of interactions, visually detected objects, languages spoken, etc. may be monitored. Data representing these interactions and conditions can be transmitted to a remote analysis platform during transmission operation 520.

Comparison operation 530 allows the data to be compared to an aggregated set of data where variations (e.g., to the norm) are monitored. If no deviations are detected during detection operation 540, then detection operation 540 branches to monitoring operation 510 where additional data is collected. If deviations are detected during detection operation 540, then detection operation 540 branches to modification operation 550 where the script is modified or customized for the user of the synthetic character.

Exemplary Computer System Overview

Figure 6:
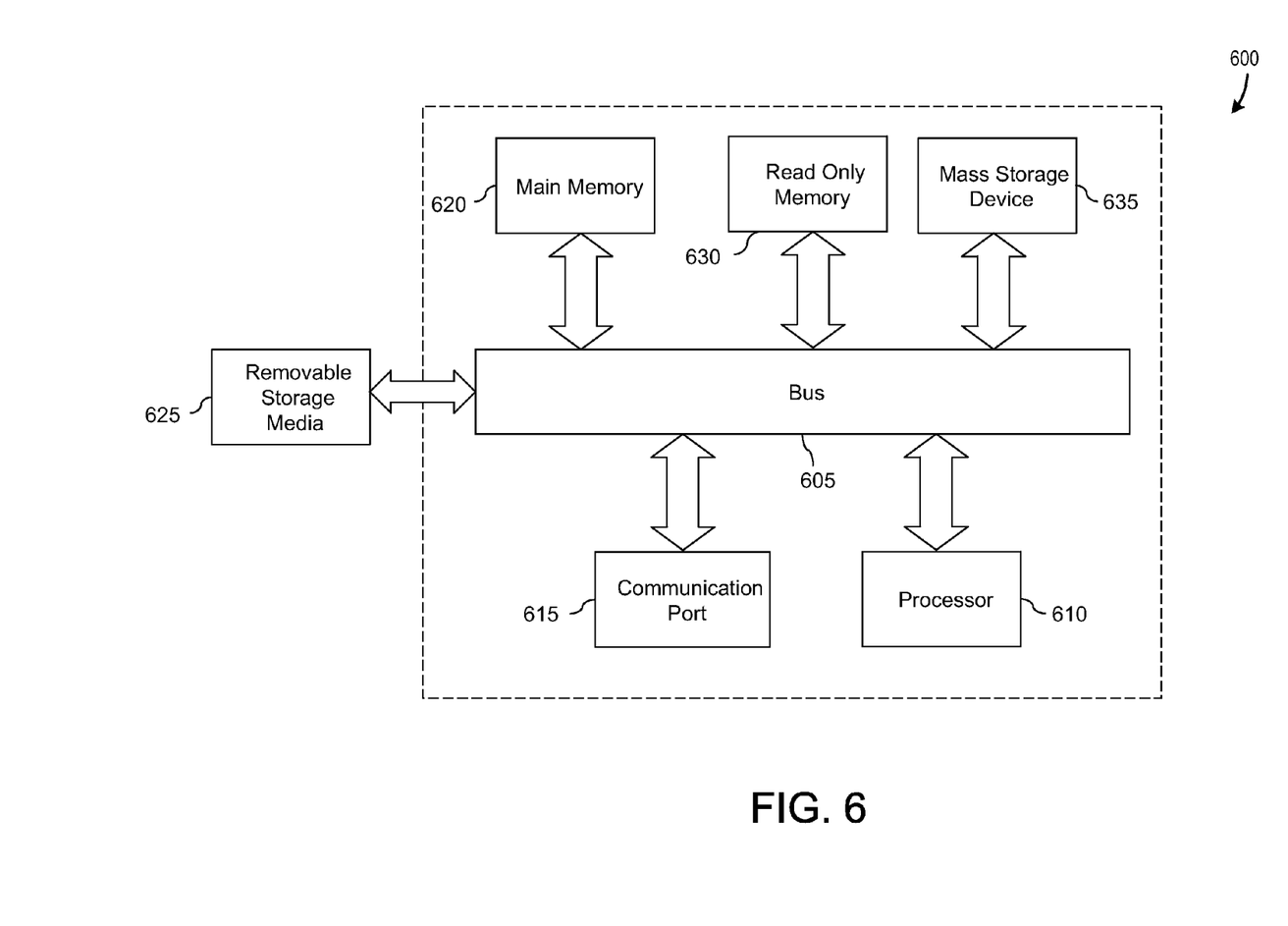
FIG. 6 illustrates an example of a computer system with which some embodiments of the present invention may be utilized.

Embodiments of the present invention include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 6 is an example of a computer system 600 with which embodiments of the present invention may be utilized. According to the present example, the computer system includes a bus 605, at least one processor 610, at least one communication port 615, a main memory 620, a removable storage media 625, a read only memory 630, and a mass storage 635.

Processor(s) 610 can be any known processor, such as, but not limited to, an Intel® Itanium® or Itanium 2® processor (s), or AMD® Opteron® or Athlon MP® processor(s), or Motorola® lines of processors. Communication port(s) 615 can be any of an RS-232 port for use with a modem based dialup connection, a 10/100 Ethernet port, or a Gigabit port using copper or fiber. Communication port(s) 615 may be chosen depending on a network such a Local Area Network (LAN), Wide Area Network (WAN), or any network to which the computer system 600 connects.

Main memory 620 can be Random Access Memory (RAM), or any other dynamic storage device(s) commonly known in the art. Read only memory 630 can be any static storage device(s) such as Programmable Read Only Memory (PROM) chips for storing static information such as instructions for processor 610.

Mass storage 635 can be used to store information and instructions. For example, hard disks such as the Adaptec® family of SCSI drives, an optical disc, an array of disks such as RAID, such as the Adaptec family of RAID drives, or any other mass storage devices may be used.

Bus 605 communicatively couples processor(s) 610 with the other memory, storage and communication blocks. Bus 605 can be a PCI/PCI-X or SCSI based system bus depending on the storage devices used.

Removable storage media 625 can be any kind of external hard-drives, floppy drives, IOMEGA® Zip Drives, Compact Disc—Read Only Memory (CD-ROM), Compact Disc—Re-Writable (CD-RW), Digital Video Disk—Read Only Memory (DVD-ROM).

The components described above are meant to exemplify some types of possibilities. In no way should the aforementioned examples limit the scope of the invention, as they are only exemplary embodiments.

In conclusion, the present invention provides novel systems, methods and arrangements for creating customized interactive content for synthetic characters. While detailed descriptions of one or more embodiments of the invention have been given above, various alternatives, modifications, and equivalents will be apparent to those skilled in the art without varying from the spirit of the invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof. Therefore, the above description should not be taken as limiting the scope of the invention, which is defined by the appended claims.

What is claimed is:

1. A method comprising:
   receiving sensor data generated by a sensor of a synthetic character, the synthetic character comprising an animation module configured to control the interactions of the synthetic character based on instructions from a traversable script;
   generating, at an analytics engine, an activity index, wherein the activity, index includes a set of script analytics generated by a logical analysis of the sensor data, and further wherein the analytics engine calculates normative variations in the set of script analytics compared to an aggregated data set;
   generating a traversable script update by automatically generating new traversable behavior based on the normative variations detected in the activity index, and enabling manual updates by generating a script editor that allows a user to modify the traversable script;
   sending the traversable script update to the synthetic character; and
   causing the traversable script update to be implemented by the synthetic character.

2. The method of claim 1, wherein generating the traversable script update includes using a learning algorithm to generate new interactions automatically.

3. The method of claim 2, wherein generating the traversable script update occurs in real-time.

4. The method of claim 3, wherein the interactions of the synthetic character include moving or speaking.

5. The method of claim 1, wherein the synthetic character is a physical toy.

6. The method of claim 4, wherein the analytics engine includes a first analytics engine collocated with the synthetic character and a second analytics engine communicably coupled to the synthetic character via a network.

7. The method of claim 6, wherein the activity index includes a statistical analysis of the data.

8. The method of claim 7, wherein the activity index tracks spoken or typed phrases, language use, user demographics, length of interactions, current environmental conditions, and location.

9. A system comprising:
a synthetic character further comprising
- a sensor configured to create sensor data based on conditions of a local environment or interactions with a user;
- an animation module configured to control the interactions of the synthetic character based on instructions from a traversable script;
- a first communication module configured to send the sensor data to, and receive a traversable script update from, a second communication module of an analysis platform;
- a modification module configured to implement the traversable script update; and
- a first memory configured to store the sensor data, traversable script, animation module, modification module, and first communication module;

the analysis platform further comprising
- a second communication module configured to receive the sensor data from, and send the traversable script update to, the first communication module of the synthetic character;
- an analytics engine configured to generate an activity index, wherein the activity index is a set of script analytics, wherein the analytics engine calculates normative variations in the set of script analytics compared to an aggregated data set, and further wherein the traversable script update is generated based on the normative variations; and
- a second memory configured to store the sensor data received by the second communications module, the second communication module, and the analytics engine, wherein the traversable script update is generated by automatically generating new traversable behavior based on the normative variations in the activity index, and enabling manual updates by generating a script editor that allows the user to modify the traversable script.

10. The system of claim 9, wherein the script editor includes a learning algorithm.

11. The system of claim 9, further comprising a digital library configured to store a plurality of interactions sorted by categories that can be accessed by the script editor.

12. The system of claim 9, wherein the analysis platform includes a recommendation module that associates the normative variations with one or more responses to generate the traversable script update.

13. The system of claim 9, wherein the sensor is adapted to detect one or more of speech patterns, movement in a local environment, movement of a physical object in relation to the synthetic character, and local environmental conditions.

14. The system of claim 13, wherein the analysis platform further comprises a data processing module that includes a speech recognition or natural language processing system to collect voice data.

15. The system of claim 9, wherein the activity index tracks one or more of spoken phrases, typed phrases, a time of interaction, a length of interaction, a location, a list of visually detected objects, a language spoken, and user demographics.

16. The system of claim 9, further comprising a memory store to locally cache the traversable script from a remote database.

17. The system of claim 9, further comprising a state engine to transition from a first state to a second state within the traversable script upon matching an input to a transition condition set forth by the traversable script.

18. The system of claim 17, wherein the traversable script specifies an animation or a sound effect.

19. The system of claim 18, wherein the sound effect includes a voice simulated reading of text, a media clip, a recorded speaker, or a live speaker.

20. The system of claim 9, wherein the analytics platform is collocated with the synthetic character.

21. The system of claim 9, wherein the analytics platform is remote from the synthetic character.

22. A computer-implemented method for updating content for a synthetic character comprising:
- generating sensor data from a sensor of the synthetic character, the synthetic character comprising an animation module configured to control the interactions of the synthetic character based on instructions from an existing traversable script;
- transmitting the sensor data to an analysis platform, wherein the analysis platform comprises an analytics engine that calculates normative variations in an activity index compared to an aggregated data set;
- receiving, from the analysis platform, a traversable script update that, is generated by automatically generating new traversable behavior based the normative variations detected in the activity index and enabling manual updates by generating a script editor that allows a user to modify the existing traversable script, wherein the activity index is generated by an analytics engine that calculates normative variations in the set of script analytics compared to an aggregated data set, and further wherein the traversable script update is generated based on the normative variations;
- implementing the traversable script update into the existing traversable script, thereby creating an updated traversable script; and
- causing the synthetic character to interact, wherein the interaction is controlled by the updated traversable script.

23. The computer-implemented method of claim 22, wherein the traversable script update is created using a learning algorithm to generate new interactions.

24. The computer-implemented method of claim 23, wherein creation of the traversable script update occurs in real-time.

25. The computer-implemented method of claim 22, wherein the synthetic character is a physical toy or is associated with a physical toy.

26. The computer-implemented method of claim 24, wherein the analysis platform receives the sensor data in real-time.

27. The computer-implemented method of claim 22, wherein the traversable script update includes a statistical analysis of the sensor data that includes a visual display.

* * * * *